US012482438B2

(12) United States Patent
Reinhard et al.

(10) Patent No.: US 12,482,438 B2
(45) Date of Patent: Nov. 25, 2025

(54) PIXEL MODIFICATION TO REDUCE ENERGY CONSUMPTION OF A DISPLAY DEVICE

(71) Applicant: INTERDIGITAL MADISON PATENT HOLDINGS, SAS, Paris (FR)

(72) Inventors: Erik Reinhard, Hede-Bazouges (FR); Christel Chamaret, Chantepie (FR); Edouard Francois, Bourg des Comptes (FR); Zoubida Ameur, Cesson-Sevigne (FR); Milos Radosavljevic, Rennes (FR); Laurent Blonde, Thorigne-Fouillard (FR); Claire-Helene Demarty, Montreuil le Gast (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 59 days.

(21) Appl. No.: 18/290,126

(22) PCT Filed: May 3, 2022

(86) PCT No.: PCT/EP2022/061872
§ 371 (c)(1),
(2) Date: Nov. 9, 2023

(87) PCT Pub. No.: WO2022/238183
PCT Pub. Date: Nov. 17, 2022

(65) Prior Publication Data

US 2024/0290297 A1 Aug. 29, 2024

(30) Foreign Application Priority Data

May 11, 2021 (EP) .................................... 21305604
Jan. 14, 2022 (EP) .................................... 22305032

(51) Int. Cl.
*G09G 5/10* (2006.01)
*G09G 3/3208* (2016.01)

(52) U.S. Cl.
CPC ............. *G09G 5/10* (2013.01); *G09G 3/3208* (2013.01); *G09G 2320/0626* (2013.01); *G09G 2330/021* (2013.01)

(58) Field of Classification Search
CPC ..... G09G 2320/0626; G09G 2330/021; G09G 2360/16; G09G 3/32; G09G 3/3208; G09G 5/10
See application file for complete search history.

(56) References Cited

U.S. PATENT DOCUMENTS

2008/0186393 A1* 8/2008 Lee ..................... G09G 3/3406 348/301
2010/0149223 A1 6/2010 Betts-Lacroix
(Continued)

FOREIGN PATENT DOCUMENTS

EP 1956584 A2 8/2008
WO WO 0074385 A2 12/2000

OTHER PUBLICATIONS

Dong et al., "Power-Saving Color Transformation of Mobile Graphical User Interfaces on OLED-based Displays", Association for Computing Machinery (ACM), iISLPED '09: Proceedings of the 2009 ACM/IEEE international symposium on Low power electronics and design, San Francisco, California, USA, Aug. 19, 2009, 4 pages.
(Continued)

*Primary Examiner* — Kenneth Bukowski
(74) *Attorney, Agent, or Firm* — VOLPE KOENIG

(57) ABSTRACT

A method and device for reducing power consumption of display devices proposes to reduce the total amount of light emitted in a perceptually indistinguishable manner based on the on the human visual sensitivity at the position of a pixel.
(Continued)

The visibility of the processing can be made to remain provably below threshold, whereas other techniques may not be able to provide such proof. This is achieved by determining a minimum detectable modulation or a corresponding just-noticeable difference based on frequency intensity information for a pixel representative of how much there is of a set of frequencies at the pixel and a contrast sensitivity function representative of a model of human vision that predicts which contrasts at which frequencies are visible to the human eye. Pixel values may be reduced based on this minimum detectable modulation or just-noticeable difference. The contrast sensitivity function may be given by Barten's model and the frequency intensity information may be based on a hierarchical map built using a discrete wavelet transform or a continuous wavelet transform.

15 Claims, 3 Drawing Sheets

(56) References Cited

U.S. PATENT DOCUMENTS

2012/0044224 A1* 2/2012 Michisaka ........... G09G 3/3426
345/207
2022/0351336 A1* 11/2022 Smith ........................ G06T 5/20

OTHER PUBLICATIONS

Wee et al., "Focus: A Usable & Effective Approach to OLED Display Power Management", Association for Computing Machinery (ACM), UbiComp '13: Proceedings of the 2013 ACM international joint conference on Pervasive and ubiquitous computing, Zurich, Switzerland, Sep. 8, 2013, 10 pages.
Chang et el., "SSIM-based Quality-on-Demand Energy-Saving Schemes for OLED displays", Institute of Electrical and Electronics Engineers (IEEE), IEEE Transactions on Systems, Man, and Cybernetics: Systems, vol. 46, Issue No. 5, May 2016, 13 pages.
Miller et al., "Perceptual Signal Coding for More Efficient Usage of Bit Codes", Institute of Electrical and Electronics Engineers (IEEE), SMPTE Motion Imaging Journal, vol. 122, Issue No. 4, May 2013, 8 pages.
Lin et al., "CURA: A Framework for Quality-retaining Power Saving on Mobile OLED Displays", Association for Computing Machinery (ACM), ACM Transactions on Embedded Computing Systems, vol. 15, Issue No. 4, Article 76, Aug. 2016, 25 pages.
Huang et al., "Mini-LED, Micro-LED and OLED displays: present status and future perspectives", Light: Science and Applications 9, Article No. 105, Jun. 18, 2020, 16 pages.
Chondro et al., "Depth-based dynamic lightness adjustment power-saving algorithm for AMOLED in head-mounted display", Optics Express, vol. 26, Issue No. 25, Dec. 10, 2018, 8 pages.
Dalton et al., "Sensing User Intention and Context for Energy Management", USENIX, The Advanced Computing Systems Association, 9th Conference on Hot Topics in Operating Systems (HOTOS '03), Lihue, Hawaii, USA, May 18, 2003, 9 pages.
Chen et al., "FingerShadow: An OLED Power Optimization based on Smartphone Touch Interactions", USENIX, The Advanced Computing Systems Association, 6th Workshop Power-Aware Computing Systems (HotPower '14), Broomfield, Colorado, USA, Oct. 5, 2014, 5 pages.
Chondro et al., "Advanced Multimedia Power-Saving Method Using a Dynamic Pixel Dimmer on AMOLED Displays", Institute of Electrical and Electronics Engineers (IEEE), IEEE Transactions on Circuits and Systems for Video Technology, vol. 28, Issue 9, Sep. 2018, 10 pages.
Tsai et al., "Depth-Guided Pixel Dimming With Saliency-Oriented Power-Saving Transformation for Stereoscope AMOLED Displays", Institute of Electrical and Electronics Engineers (IEEE), IEEE Transactions on Circuits and Systems for Video Technology, vol. 30, Issue 9, Sep. 2020, 11 pages.
Wee et al., "Adaptive Display Power Management for OLED displays", Association for Computing Machinery (ACM), MobileGames '12: Proceedings of the first ACM international workshop on Mobile gaming, Helsinki, Finland, Aug. 13, 2012, 6 pages.
Yeh et al., "Visual-Attention-Based Pixel Dimming Technique for OLED Displays of Mobile Devices", Institute of Electrical and Electronics Engineers (IEEE), IEEE Transactions on Industrial Electronics, vol. 66, Issue No. 9, Sep. 2019, 9 pages.
Chen et al., "MORPh: Mobile OLED-friendly Recording and Playback System for Low Power Video Streaming", Association for Computing Machinery (ACM), DAC '16: Proceedings of the 53rd Annual Design Automation Conference, Austin, Texas, Jun. 5, 2016, 6 pages.
Park et al., "Saving Power in Video Playback on OLED Displays by Acceptable Changes to Perceived Brightness", Institute of Electrical and Electronics Engineers (IEEE), Journal of Display Technology, vol. 12, Issue No. 5, May 2016, 8 pages.
Chondro et al., "Perceptually Hue-Oriented Power-Saving Scheme with Overexposure Corrector for AMOLED Displays", Institute of Electrical and Electronics Engineers (IEEE), Journal of Display Technology, vol. 12, Issue No. 8, Aug. 2016, 10 pages.
Choubey et al., "Content Aware Targeted Image Manipulation to Reduce Power Consumption in OLED panels", Institute of Electrical and Electronics Engineers (IEEE), 2015 Eighth International Conference on Contemporary Computing (IC3), Noida, India, Aug. 20, 2015, 5 pages.
Jan et al., "A Power-Saving Histogram Adjustment Algorithm for OLED-Oriented Contrast Enhancement", Institute of Electrical and Electronics Engineers (IEEE), Journal of Display Technology, vol. 12, Issue No. 4, Apr. 2016, 8 pages.
Li et al., "Making Image More Energy Efficient for OLED Smart Devices", Hindawi, Mobile Information Systems, vol. 2016, Article ID 6575931, Dec. 19, 2016, 8 pages.
Shin et al., "Dynamic Voltage Scaling of OLED Displays", Association for Computing Machinery (ACM), DAC '11: Proceedings of the 48th Design Automation Conference, San Diego, California, USA, Jun. 2011, 6 pages.
Lin et al., "ShiftMask: Dynamic OLED Power Shifting Based on Visual Acuity for Interactive Mobile Applications", Institute of Electrical and Electronics Engineers (IEEE), 2017 IEEE/ACM International Symposium on Low Power Electronics and Design (ISLPED), Taipei, Taiwan, Jul. 24, 2017, 6 pages.

* cited by examiner

PIXEL MODIFICATION TO REDUCE ENERGY CONSUMPTION OF A DISPLAY DEVICE

CROSS REFERENCE TO RELATED APPLICATIONS

This application is a U.S. National Stage Application under 35 U.S.C. § 371 of International Patent Application No. PCT/EP2022/061872, filed 3 May 2022, which is incorporated herein by reference in its entirety.

This application claims priority to European Application No. 21305604.7, filed 11 May 2021, and European Patent Application No. 22305032.9, filed 14 Jan. 2022; each of which is incorporated herein by reference in its entirety.

1. FIELD OF THE DISCLOSURE

The present invention relates generally to image processing as well as energy consumption. More specifically the invention relates to reduction of the energy requirements of display devices.

2. TECHNICAL BACKGROUND

The media and entertainment industry consumes a significant amount of energy to create, distribute and present video content to consumers. A large proportion of this energy is used by display devices, notably by the 1.9+ billion displays installed in consumers' homes globally. The production of light within a display is the main reason for this energy use, across all technologies used in current televisions. Reducing the global energy use of display devices is therefore a topic of prime concern, by any means possible. Due to the very large number of displays currently in use, even small reductions per display may end up globally saving enormous amounts of energy. Moreover, the increase in display resolution from SD to HD to 4K and soon to 8K and beyond, as well as the introduction of high dynamic range imaging, has brought additional increase in energy requirements of display devices. This is not consistent with the global need to reduce energy consumption.

This is particularly relevant for display devices based on OLED technologies and notably for mobile display devices where battery life is an important factor. In such OLED-based display devices, the relationship between light emitted by a pixel and the energy used to produce this light is roughly linear, with lighter pixels using more energy. The efficiency of an OLED panel is mostly determined by driving circuitry designs, LED quantum efficiency and optical system efficiency (see Huang et al, "Mini-LED, Micro-LED and OLED displays: present status and future perspectives", Light: Science and Applications 9:105, 2020). It is also an issue for back-lit LCD displays.

Embodiments described hereafter have been designed with the foregoing in mind.

3. SUMMARY

The present disclosure proposes a new and inventive solution for reducing the energy consumption of display devices. It is proposed to reduce pixel values, so that a display device (such as an OLED or LED display) uses less electricity to produce the image.

This issue has been addressed under different angles, for example by dimming regions of the picture to be displayed outside of a detected region of interest (for example based on saliency or visual attention model) or based on user interactions with the device.

Light production in display devices (for example: televisions, smartphones, tablets, laptops, cameras) is costly. Reduction of the amount of light produced is desirable, as this helps to reduce the amount of energy necessary to operate the display. The advantage of this can be two-fold: less pressure on the climate, and longer battery life in mobile devices. Relative to other methods that aim to reduce pixel values for the same reasons, at least one embodiment, by means of its construction, guarantees that the processing remains below visible threshold. For that purpose, the amount by which each pixel is changed may be less than 1 just-noticeable difference (JND). Key here is that for each pixel its corresponding JND may be different. A per-pixel JND can be computed for each pixel using the steps outlined below. To know how much contrast is available at a given pixel in a given frame, a hierarchical map can be built. This is generally done with a wavelet transform. While in many graphics applications a simple discrete wavelet transform, usually using a Haar wavelet, is a logical choice, the tradeoff between spatial localization and frequency analysis is sub-optimal. This is used in the first method described below. Another option in this regard is the continuous wavelet transform (CWT) which is what we therefore use in the second method described below. As the sensitivity of the human visual system is not significantly orientation-dependent, a continuous wavelet transform using the anisotropic Mexican hat wavelet may give excellent results without expending more computing cycles than necessary.

Although described in the context of display devices based on OLED technology, the principles of the disclosure are not limited to this context and also apply to other types of displays such as local dimming LED displays, mini-LED displays and micro-LED displays. The principles of the disclosure also apply to MEMs-based display technologies A first aspect of the present disclosure relates to a method for determining a minimum detectable modulation value, for a pixel x of an image located at a position within an input image, based on human visual sensitivity at the position of the pixel; and scaling a luminance of the pixel by an amount based on the minimum detectable modulation value. In a variant of the first aspect, the scaled luminance value is determined as $L_{reduced}(x)=L(x)(1-f\ m(x))/(1+f\ m(x))$ where L(x) is a luminance level at the location of the pixel x, m(x) is the minimum detectable modulation determined for the pixel x and f is a modulation factor. In variants of the first aspect, the human visual sensitivity at the location of the pixel is based on the luminance of the pixel, a frequency intensity information for the pixel representative of how much there is of a set of frequencies at the pixel and a contrast sensitivity function representative of a model of human vision that predicts which contrasts at which frequencies are visible to a human eye. In further variants of the first aspect, the contrast sensitivity function is given by Barten's model, the frequency intensity information is based on a hierarchical map built using a discrete wavelet transform or a continuous wavelet transform.

A second aspect of the present disclosure relates to a device comprising a processor configured to determine a minimum detectable modulation value, for a pixel x of an image located at a position within an input image, based on human visual sensitivity at the position of the pixel; and scale the luminance of the pixel by an amount based on the minimum detectable modulation value. In a variant of the second aspect, the scaled luminance value is determined as Lreduced(x)=L(x)(1−f m(x))/(1+f m(x)) where L(x) is a luminance level at the location of the pixel x, m(x) is the minimum detectable modulation determined for the pixel x and f is a modulation factor. In variants of the second aspect, the human visual sensitivity at the location of the pixel is based on the luminance of the pixel, a frequency intensity information for the pixel representative of how much there is of a set of frequencies at the pixel and a contrast sensitivity function representative of a model of human vision that predicts which contrasts at which frequencies are visible to a human eye. In further variants of the second aspect, the contrast sensitivity function is given by Barten's model, the frequency intensity information is based on a hierarchical map built using a discrete wavelet transform or a continuous wavelet transform. In a variant embodiment of second aspect, the device is selected in a group comprising a set top box, a video receiver, a video player. In other variant embodiments of the second aspect, the device further comprises a screen and the processor is further configured to display the determined image with reduced luminance, the screen is based on OLED display technology, micro-LED technology, mini-LED technology, MEMs technology, LCD display technology with uniform or non-uniform backlight based on CCFL, LED, mini-LED or micro-LED technologies, the device is selected in a group comprising a TV set, a smartphone, a laptop, a camera, and a tablet.

A third aspect relates to a computer program product comprising program code instructions for implementing the method according to the first aspect or any variant embodiment of first aspect, when said program is executed on a computer or a processor.

A fourth aspect relates to a non-transitory computer-readable storage medium storing the program code instructions for implementing the method according to the first aspect or any variant embodiment of first aspect.

4. BRIEF DESCRIPTION OF THE DRAWINGS

The invention can be better understood with reference to the following description and drawings, given by way of example and not limiting the scope of protection, and in which.

5. DESCRIPTION OF EMBODIMENTS

Figure 1:
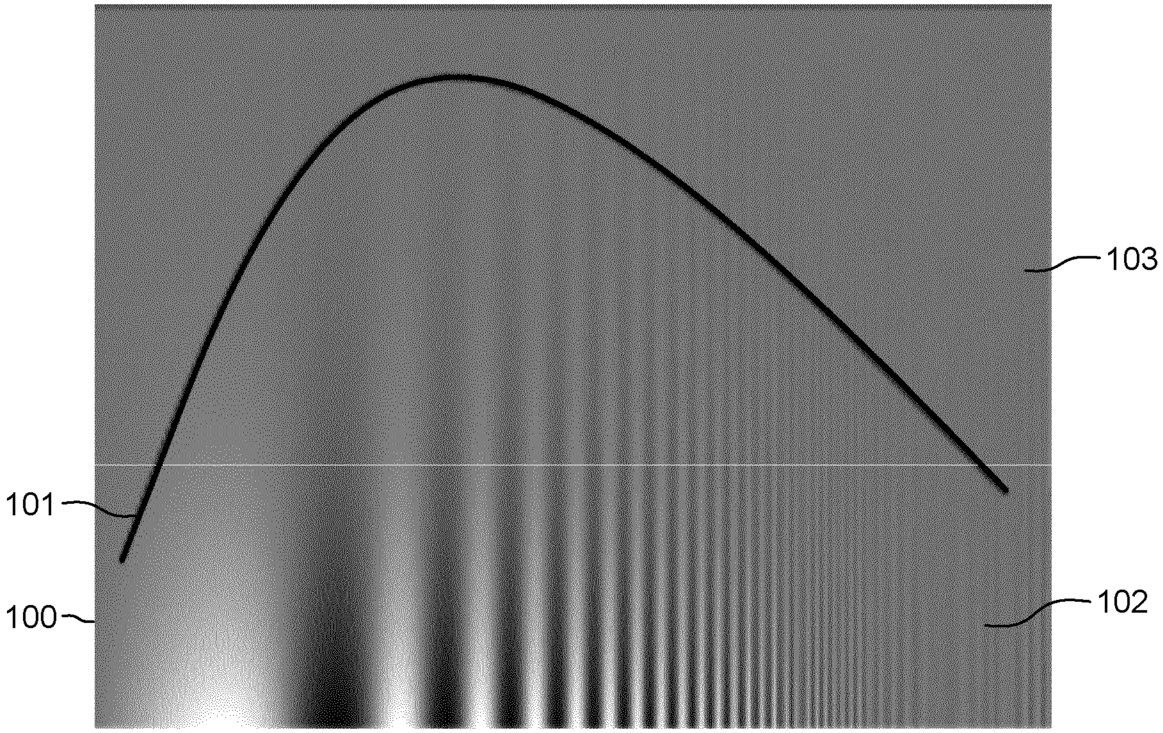
FIG. 1 illustrates a chart representing the visibility of contrast at different frequencies.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more details, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks. Specific structural and functional details disclosed herein are merely representative for purposes of describing example embodiments of the present invention. This invention may, however, be embodied in many alternate forms and should not be construed as limited to only the embodiments set forth herein.

Embodiments described herein use both terms of "just-noticeable differences" (JNDs) and "minimum detectable modulation" (MDM). Although expressed differently, these terms correspond to the same concept and represent a threshold for variations of luminance for a pixel for which a variation smaller than this value will not be perceived by a typical viewer, while a variation greater than this value may be perceived by the viewer. The relationship between the two terms can be expressed as:

$$JND = L - L\frac{1 - m(x)}{1 + m(x)}$$

where JND is the just-noticeable difference, m(x) is the minimum detectable modulation for a pixel x, and L is the luminance for this pixel. Both terms are used interchangeably.

At least one embodiment proposes to reduce the total amount of light emitted in a perceptually indistinguishable manner by directly employing a contrast sensitivity function (CSF). The visibility of the processing remains provably below the minimum detectable modulation threshold, whereas other techniques may not be able to provide such proof. This is achieved by using a CSF model that enables the calculation of just-noticeable differences (JNDs) and reducing pixel values based on JNDs. In at least one variant embodiment, it is proposed to reduce the pixel value by at most 1 JND. In at least one variant embodiment, it is proposed to reduce the pixel value by more than 1 JND, thus losing the provability but providing better energy consumption.

FIG. 1 illustrates a chart representing the visibility of contrast at different frequencies. A contrast sensitivity function (CSF) is a model of human vision that predicts which contrasts at which frequencies are visible to the human eye. The visibility of contrast depends both on the frequency and on the magnitude of the contrast as shown in FIG. 1. In this figure, the chart 100 is a Campbell-Robson chart in which luminance is modulated according to a sinus function which linearly increases in frequency from left to right, and linearly increases in magnitude from top to bottom. The curve 101 represents the frontier for which the contrast is just barely visible. Thus, the lower part 102 represents the area where the contrast is visible while the upper part 103 represents the area where the contrast is not visible. Note that humans are most sensitive to contrasts of about 1-2 cycles per degree. Therefore, modifications of image may be unnoticed if done within the area 103.

There are a number of models available for modeling contrast sensitivity. Barten's model (Barten, Peter G J. Contrast sensitivity of the human eye and its effects on image quality. SPIE press, 1999.) tends to be seen as the most complete model, and other models are often validated by comparison against this model.

Barten's CSF model can be summarized as follows. The contrast sensitivity S(L, u) as function of luminance L and frequency u is given by equation 1:

$$S(L,u)=\frac{M_{opt}(u)/k}{\sqrt{\frac{2}{T}\left(\frac{1}{X_0^2}+\frac{1}{X_{max}^2}+\frac{u^2}{N_{max}^2}\right)\left(\frac{1}{\eta pE}+\frac{\Phi_0}{1-e^{-(u/u_0)^2}}\right)}} \quad \text{(eq. 1)}$$

where $$M_{opt}(u)=e^{-2\pi^2\sigma^2u^2}$$

$$\sigma=\frac{\sqrt{\sigma_0^2+(C_{ab}d)^2}}{60}$$

$$d=5-3\tanh\left(0.4\log\left(\frac{LX_0^2}{40^2}\right)\right)$$

$$E=\frac{\pi d^2}{4}L\left(1-\left(\frac{d}{9.7}\right)^2+\left(\frac{d}{12.4}\right)^4\right)$$

The following constants are also specified:

$$k=3.0$$

$$\sigma_0=0.5\text{arcmin}$$

$$C_{ab}=0.08\text{ arcmin/mm}$$

$$T=0.1\text{ s}$$

$$X_{max}=12^\circ$$

$$X_0=40^\circ$$

$$N_{max}=15\text{ cycles}$$

$$\eta=0.03$$

$$\Phi_0=3\times10^{-8}\text{ s }deg^2$$

$$u_0=7\text{ cycles}/deg$$

$$p=1.2\times10^6\text{ photons/s}/deg^2/Td$$

This model is independent of the content of the image and thus may either be computed in the device or predetermined and loaded from memory.

An input image is typically specified as an 8 bit SDR image, or perhaps a 10- or 12-bit HDR image. Nominally, the codeword values in an SDR image encode a luminance range between 0 and 100 cd/m$^2$. The codeword values in an HDR image may encode a larger range, for example between 0 and 10000 cd/m$^2$. As Barten's model is specified in absolute luminance values, the input RGB image is first converted to linear XYZ, and a luminance-only image L is derived from the Y channel of the RGB image. For SDR images, this luminance image is scaled to be between 0 and 100. If the input image is an HDR image, the luminance image is scaled according to the assumed peak luminance.

The principle of the embodiments described herein is to reduce pixel values, for example luminance values, so that a display uses less electricity to produce the image. In at least one embodiment, the amount by which each pixel is changed will be less than 1 just-noticeable difference (JND). Key here is that for each pixel its corresponding JND may be different. A per-pixel JND can be computed using the following steps, in which the pixel located at the position x within the image is identified as pixel x.

To know how much contrast is available at a given pixel in a given frame, a first method is proposed. This first method uses for example a discrete wavelet transform (DWT) to build a hierarchical map, for example based on the Haar wavelet, or for example based on the following wavelet families: Daubechies, coiflets, symlets, Fejér-Korovkin, Discrete Meyer, or (reverse) biorthogonal. A hierarchical map gives information about how much there is of each frequency $u_i$ at a given pixel location x. Let's say that for each pixel x the amount of contrast at a given frequency u is given by DWT (x, $u_i$). Let the luminance of pixel x be given by L. Using this map and Barten's CSF S(L, $u_i$), it is possible to determine for which frequency $u_i$ at pixel location x the weighted CSF DWT (x, $u_i$)S(L, $u_i$) produces a maximum:

$$u=\underset{u_i}{\text{argmax}}\,DWT(x,u_i)S(L,u_i) \quad \text{(eq. 2a)}$$

As there are 10 wavelet levels i, the output u of this process has one of only 10 different values. As this process is carried out for all pixels individually, the pixelmap of frequencies u also contains only 10 different values, which are logarithmically spaced. Therefore, an additional filtering step is inserted, whereby a smoothing kernel is passed over the frequency map u. The description below is based on a Gaussian kernel but other types of smoothing could be used such as box filters, tent filters, cubic filters, sinc filters, bilateral filters, etc. The standard deviation σ of the kernel is empirically determined to be:

$$\sigma_g=\frac{\max(N_x,N_y)}{12} \quad \text{(eq. 2b)}$$

where $N_x$ and $N_y$ are the horizontal and vertical resolutions of the input image. The Gaussian smoothing kernel G is given by:

$$G(x,y)=\frac{1}{2\pi\sigma_g^2}e^{-\frac{x^2+y^2}{2\sigma_g^2}} \quad \text{(eq. 2c)}$$

The smoothed frequency map is then given by:

$$u'=u\otimes G \quad \text{(eq. 2d)}$$

The effect of smoothing has an undesirable side effect, which is that the range of values of u' is reduced relative to the range of values in u. To address this issue, the filtered frequency map u' is scaled as follows:

$$u'' = u' \frac{\max(u)}{\max(u')} \quad \text{(eq. 2e)}$$

This scaling of the filtered frequency map represents an appropriate solution for still images. However, for video content the scaling by the ratio of maxima in u and u' may lead to temporal artefacts, notably flicker. Temporal artefacts may be remedied by subjecting these maxima to a process known as leaky integration, in this case achieved as follows: Assume that subscript t indicates frame number, and that the scaling for frame t−1 is given by $s_{t-1}$. The scaling for the current frame is then given by $s_t$:

$$s_t = \alpha s_{t-1} + (1-\alpha)\frac{\max(u)}{\max(u')} \quad \text{(eq. 2f)}$$

The scaled frequency map for frame t is then determined as $u''_t = u'_t\, s_t$. For video content, this is an appropriate solution for scaling the frequency map. The value of a is in the range [0; 1]. An example value is given by $\alpha$=0.8.

Using Barten's contrast sensitivity function, it is now possible to determine the human visual sensitivity S(x) at pixel location x by setting:

$$S(x)=S(L,u) \quad \text{(eq.3a)}$$

As an aside, equations 2a to 3a were mostly expressed as per-pixel operations, except for the filtering step, which is necessarily a spatially varying operation, and therefore cannot be expressed as a per-pixel operation. It is, however, possible to summarize the procedure from Equations 2a to 3a into a single vector-valued expression, as follows:

$$S_{img} = S\left(L, kG \otimes \underset{u_i}{\operatorname{argmax}}(DWT \cdot S(L, u_i))\right) \quad \text{(eq. 3b)}$$

where $S_{img}$ is the pixel map of contrast sensitivities equivalent to the per-pixel formulation of Eq 9a, L is the pixel map of luminance values of the input image, and k is a constant representing the scalings of either Eq 8a or Eq 8b. From the sensitivity S(x) the minimum detectable modulation m(x) can be determined (Miller, Scott, Mahdi Nezamabadi, and Scott Daly. "Perceptual signal coding for more efficient usage of bit codes." SMPTE Motion Imaging Journal 122, no. 4 (2013): 52-59.):

$$m(x) = \frac{1}{S(x)} \quad \text{(eq. 4)}$$

The contrast between two luminance values $L_{high}$ and $L_{low}$ can be determined by the well-known Michelson contrast:

$$C_{michelson} = \frac{L_{high} - L_{low}}{L_{high} + L_{low}}$$

For a given pixel x with luminance L the minimum detectable modulation can be equated to Michelson contrast, substituting L for $L_{high}$:

$$m(x) = C_{michelson} = \frac{L - L_{low}}{L + L_{low}}$$

From this equation the only unknown $L_{low}$ is determined as follows:

$$L_{low}(x) = L_{high}(x)\frac{1 - m(x)}{1 + m(x)} \quad \text{(eq. 5a)}$$

This means that we can compute a reduced lower pixel luminance $L_{low}$ from a pixel luminance L and the contrast sensitivity associated with it. To be conservative, m can be scaled down, for example with a modulation factor f=0.9:

$$L_{low}(x) = L(x)\frac{1 - fm(x)}{1 + fm(x)} \quad \text{(eq. 5b)}$$

With the above formulation, each new pixel will be less than 1 JND lower in value than before. Given that Barten's model was used, high luminance pixels will be reduced more than low luminance pixels. Frequency sensitivity is built in through the use of a DWT (noting that other frequency determination methods could be substituted instead).

The principles described above guarantees that the visibility of the processing remains below the threshold for as long as f is chosen to be less than 1.

The application of this method could be performed at various places in the imaging pipeline. For example, the method could be employed prior to encoding, so that a visually equivalent image/video is transmitted. The method could also be employed in a user device, for example a set-top box or Blu-ray player after decoding. In either case, the result is that the display produces less light, and therefore consumes less energy, while guaranteeing that the visual quality of the image/video is maintained.

The impact of the reduction can be tailored to different needs, by adapting the modulation factor f of equation 5b. Indeed, with f=1, the reduction of light will be perceptually indistinguishable. For some specific usage (for example in critical viewing applications such as for example encountered in post-production), a margin could be introduced with a modulation factor f of equation 5b lower than 1.0 leading to less light reduction and thus less energy consumption reduction. For example, a modulation factor f=0.9 or f=0.5 may be used. On the opposite, when energy reduction is very important, a modulation factor f of equation 5b greater than 1.0 could be used. For example, a modulation factor f=1.5 or f=2.0 may be used. In this case, the pixel modification may become visible, but the energy reduction will be more important.

To determine the frequencies of contrasts present in the neighborhood of each pixel, the first method detailed above is based on a DWT, for example using the Haar wavelet. It turns out that for the analysis of frequency content in an image, a DWT is very fast to compute, but it is not the most accurate choice, as it does not allow an optimal tradeoff between spatial localization and frequency analysis. A slower, but more accurate choice is the use of a Continuous Wavelet Transform (CWT), which provides for frequency analysis with a better spatial localization.

A large number of wavelet mother functions are available in the context of a 2-dimensional CWT and could be used in this application such as the Mexican Hat wavelet (also known as the Ricker wavelet), the Morlet wavelet, the halo and arc wavelets, the Cauchy wavelet, the Poisson wavelet. As the interest is in image analysis, whereby the occurrence of frequencies often coincides with the presence of edges, a wavelet function which performs well for edge detection is a reasonable choice. Further, a CWT can be carried out at any desired orientation. Anisotropic wavelet functions could be chosen so that frequencies at different orientations could be favored. Human vision is also known to be anisotropic in the sense that it is more sensitive to horizontal and vertical edges. However, the difference in sensitivity to horizontal/vertical edges and diagonal edges is not sufficiently significant to warrant an orientation-selective frequency analysis. As such, an isotropic wavelet may be chosen, as the computational cost of the wavelet analysis will be significantly lower. Considering these constraints, the Mexican Hat wavelet is an appropriate choice. In addition, this isotropic wavelet produces a real-valued output.

Therefore, a second method proposes to perform the frequency analysis by a continuous wavelet transform (CWT), using the Mexican Hat wavelet with 10 logarithmically spaced scales i:

$$u = \underset{u_i}{\operatorname{argmax}} CWT(x, u_i) S(L(x), u_i) \quad \text{(eq. 6)}$$

As there are 10 wavelet levels i, the output u of this process has one of only 10 different values. As this process is carried out for all pixels individually, the pixelmap of frequencies u also contains only 10 different values, which are logarithmically spaced. Therefore, an additional filtering step is inserted, whereby a Gaussian smoothing kernel is passed over the frequency map u. The standard deviation σ of the kernel is empirically determined to be:

$$\sigma_g = \frac{\max(N_x, N_y)}{12} \quad \text{(eq. 7a)}$$

where $N_x$ and $N_y$ are the horizontal and vertical resolutions of the input image. The Gaussian smoothing kernel G is given by:

$$G(x, y) = \frac{1}{2\pi\sigma_g^2} e^{-\frac{x^2+y^2}{2\sigma_g^2}} \quad \text{(eq. 7b)}$$

The smoothed frequency map is then given by:

$$u' = u \otimes G \quad \text{(eq. 7c)}$$

The effect of smoothing has an undesirable side effect, which is that the range of values of u' is reduced relative to the range of values in u. To address this issue, the filtered frequency map u' is scaled as follows:

$$u'' = u' \frac{\max(u)}{\max(u')} \quad \text{(eq. 8a)}$$

This scaling of the filtered frequency map represents an appropriate solution for still images. However, for video content the scaling by the ratio of maxima in u and u' may lead to temporal artefacts, notably flicker. Temporal artefacts may be remedied by subjecting these maxima to a process known as leaky integration, in this case achieved as follows:

Assume that subscript t indicates frame number, and that the scaling for frame t−1 is given by $s_{t-1}$. The scaling for the current frame is then given by $s_t$:

$$s_t = a s_{t-1} + (1 - a) \frac{\max(u)}{\max(u')} \quad \text{(eq. 8b)}$$

The scaled frequency map for frame t is then determined as $u''_t = u'_t s_t$. For video content, this is an appropriate solution for scaling the frequency map. The value of α is in the range [0; 1]. An example value is given by α=0.8.

Using Barten's contrast sensitivity function, as in the first method, it is now possible to determine the human visual sensitivity S(x) at pixel location x by setting:

$$S(x) = S(L, u'') \quad \text{(eq. 9a)}$$

As an aside, equations 6 to 9 were mostly expressed as per-pixel operations, except for the filtering step, which is necessarily a spatially varying operation, and therefore cannot be expressed as a per-pixel operation. It is, however, possible to summarize the procedure from Equations 6 to 9 into a single vector-valued expression, as follows:

$$S_{img} = S\left(L, k\, G \otimes \underset{u_i}{\operatorname{argmax}}(CWT \cdot S(L, u_i))\right) \quad \text{(eq. 9b)}$$

where $S_{img}$ is the pixel map of contrast sensitivities equivalent to the per-pixel formulation of Eq 9a, L is the pixel map of luminance values of the input image, and k is a constant representing the scalings of either Eq 8a or Eq 8b.

As before, the minimum detectable modulation is determined:

$$m(x) = \frac{1}{S(x)} \quad \text{(eq. 10)}$$

Note that ITU-R Report BT.2246-7 (The present state of ultra-high definition television) mentions an alternative minimum detectable modulation, $$m(x) = \frac{1}{S(x)} \frac{2}{1.27}.$$

This, however, is leading to supra-threshold adjustments, i.e., results that are visibly different from the input. This approach is therefore not advocated.

Using the minimum detectable modulation, the following multiplier r(x) is derived:

$$r(x) = \frac{1 - f m(x)}{1 + f m(x)} \quad \text{(eq. 11)}$$

where the scalar f∈[0,1] allows adjustments of less than 1 JND to be applied. It was found that in the present application, the processed result was visually indistinguishable from the input for a value of f=1.

The first method described above would apply a scaling based on this multiplier to each of the 3 color values of a pixel in RGB space. This, however, has the potential to lead to subtle hue shifts, as well as errors in chromaticities. A better approach is to apply a scaling based on this multiplier r(x) in the LCh color space, in which luminance, chrominance and hue are individually adjustable. In this color space, the luminance is modified as follows:

$$L'(x)=L(x)r(x) \quad \text{(eq. 12a)}$$

The chrominance is also reduced somewhat, as the perception of luminance and chrominance is linked:

$$C'(x)=C(x)(k+(1-k)r(x)) \quad \text{(eq. 12b)}$$

where k is a constant that determines the amount of adjustment. The range of values of k should be limited to the interval [0,1]. An appropriate adjustment is typically obtained for a value of k=0.5. For this specific value of k, the above equation can be simplified to read:

$$C'(x)=\frac{c(x)}{1+fm(x)} \quad \text{(eq. 12c)}$$

After this adjustment, the image is transformed to its desired output color space, for example an RGB color space.

Figure 2:
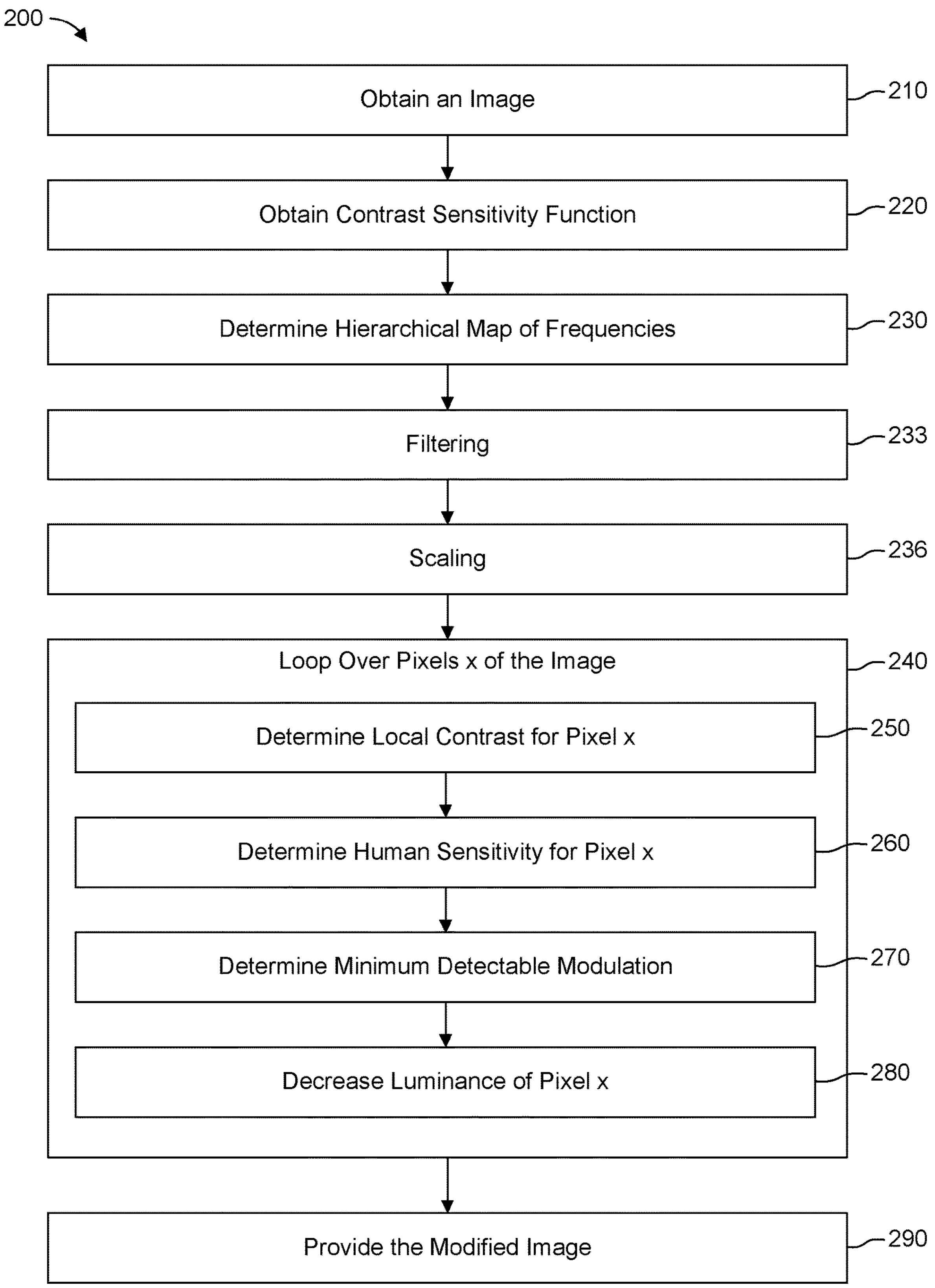
FIG. 2 illustrates a flowchart of a method for decreasing the luminance of an image according to at least one embodiment.

FIG. 2 illustrates a flowchart of a process for decreasing the luminance of an image according to at least one embodiment. The process 200 is implemented for example by a processor 301 of a display device 300.

In step 210, the image to be modified is obtained, for example received through the communication interface 303 or loaded from memory 302.

In step 220, a contrast sensitivity function CSF is obtained. The contrast sensitivity function CSF may also be predetermined. In the latter case, it may be received through the communication interface 303 or loaded from memory 302. In at least one embodiment, Barten's CSF model is used to determine the CSF.

In step 230, a hierarchical map of frequencies for the image is determined based on the pixels of the image. At pixel location x, the hierarchical map tells how much contrast is available at frequency $u_i$. In at least one embodiment based on the first method, this is done using discrete wavelet transform. In at least one embodiment based on the second method, this is done using continuous wavelet transform.

From step 250 to 280, a loop 240 iterates over the pixels x of the image.

In step 250, local contrasts for pixel x are determined for a set of frequencies by reading the hierarchical map of frequencies.

In step 260, human sensitivities for pixel x are determined for a set of frequencies.

In step 270, a minimum detectable modulation is determined by determining the frequency for which the product of local contrast and human sensitivity is highest, and by evaluating the reciprocal of the contrast sensitivity function obtained in step 220 for both the luminance associated with pixel x and the frequency determined in step 270.

In step 280, the luminance of pixel x is then decreased by a factor depending on the minimum detectable modulation. As described above, a new lower pixel luminance $L_{low}$ is determined from an initial pixel luminance L and the contrast sensitivity associated with the pixel. In other words, the pixel luminance is scaled (i.e. reduced) by an amount based on the just-noticeable difference value or on the minimum detectable modulation (which is equivalent as explained above). This scaling uses either the scaling described in relation with the first or the second method interchangeably.

In step 290, the image with reduced luminance is then provided. The image may then be displayed or transmitted to a device able to display it.

The process 300 applies to both methods described above. For the first method based on discrete wavelet transforms, the correspondence between the steps of the process 200 and the equations are as follows: equation 1 for step 220, equation 2a for step 230, equations 2b, 2c, 2d for step 233, equations 2e, 2f for step 236, equations 3a, 3b for step 260, equation 4 for step 270 and equations 5a, 5b for step 280. For the second method based on continuous wavelet transforms, the correspondence between the steps of the process 200 and the equations are as follows: equation 1 for step 220, equation 6 for step 230, equations 7a, 7b, 7c for step 233, equations 8a, 8b for step 236, equations 3a, 3b for step 260, equations 10, 11 for step 270 and equations 12a, 12b, 12c for step 280.

The second method was tested over several hundred SDR images. The tests showed that the reduction in luminance is on average 8.86%. For OLED displays this also gives the reduction in energy consumption possible, as the relationship between energy consumed and light produced is approximately linear.

Further, for SDR images the peak luminance is reduced by about 2.88 cd/$m^2$ on average (assuming a peak luminance of 100 cd/$m^2$). This means that for LCD displays, the backlight could be reduced by about 2.88%, leading to an equivalent reduction in energy consumption, as the backlight is the main source of energy consumption.

For a dataset of HDR images (from ITU-R Report BT.2245) with peak luminance of 1000 cd/$m^2$, the average reduction is 10.5% and the peak luminance is reduced on average by 121 cd/$m^2$. Thus, the energy savings possible with the present method are significant especially for HDR images.

Figure 3:
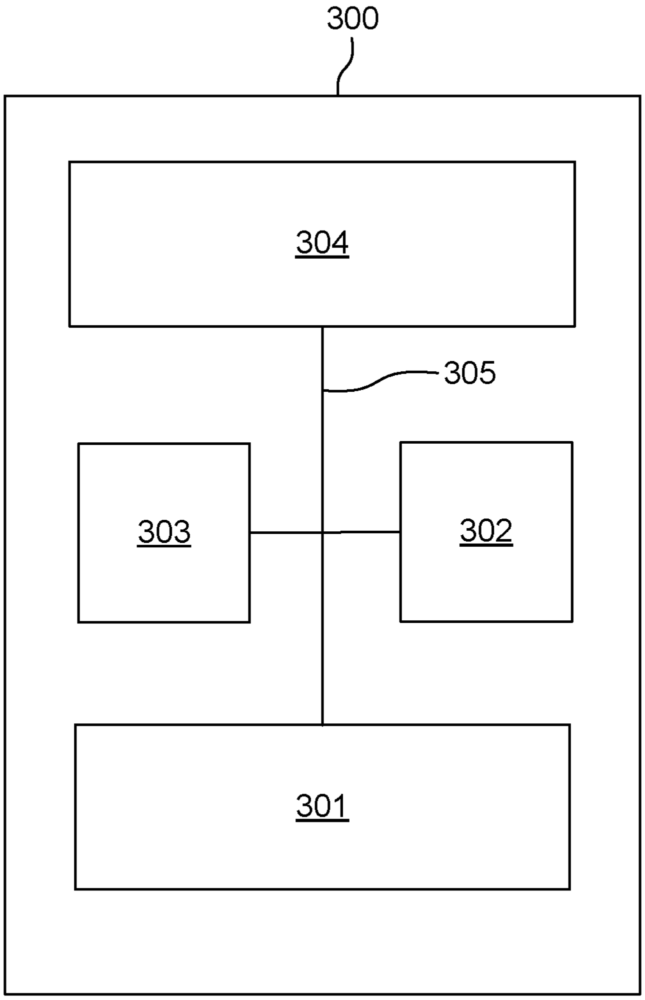
FIG. 3 illustrates a display device implementing a method for reducing the energy consumption according to at least one embodiment.

FIG. 3 illustrates a display device implementing a method for reducing the energy consumption according to at least one embodiment. The display device 300 comprises a processor 301, memory 302, a communication interface 303 and a display panel 304.

The processor 301 is configured to obtain, through the communication interface 303 an image to be displayed. The image may be stored in the memory 302 in order to perform the required computations before being provided to the display panel 304.

The display device 300 includes a processor 301 configured to execute instructions loaded therein for implementing, for example, the various aspects described in this document. The processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor can include embedded memory, input output interface, and various other circuitries as known in the art.

The display device 300 includes memory 302 which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The memory can include an internal storage device, an attached storage device (including detachable and non-detachable storage devices), and/or a network accessible storage device, as non-limiting examples.

The display device 300 includes a communication interface 303 providing input and/or output to the device 300. Such inputs include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, /or (iv) a High Definition Multimedia Interface (HDMI) input terminal and/or (v) composite video.

In various embodiments, the communication interface 303 has associated respective input processing elements as known in the art. For example, the RF portion can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna. Additionally, the communication interface 303 may comprise a USB and/or HDMI interface that can include respective interface processors for connecting the device 300 to other electronic devices across USB and/or HDMI connections. Aspects of USB or HDMI interface processing can be implemented within separate interface ICs or within processor 301 as necessary.

The communication interface 303 can include, but is not limited to, a transceiver configured to transmit and to receive data over communication channel. The communication interface 303 can include, but is not limited to, a modem or network card and can be implemented, for example, within a wired and/or a wireless medium.

Data is streamed, or otherwise provided, to the display device 300, in various embodiments, using a wireless network such as a Wi-Fi network, for example IEEE 802.11 (IEEE refers to the Institute of Electrical and Electronics Engineers). The Wi-Fi signal of these embodiments is received over the communication interface 303 which are adapted for Wi-Fi communications. The communications channel of these embodiments is typically connected to an access point or router that provides access to external networks including the Internet for allowing streaming applications and other over-the-top communications. Other embodiments provide streamed data to the display device 300 using a set-top box that delivers the data over the HDMI connection of the communication interface 303. Still other embodiments provide streamed data to the display device 300 using the RF connection of the communication interface 303. As indicated above, various embodiments provide data in a non-streaming manner. Additionally, various embodiments use wireless networks other than Wi-Fi, for example a cellular network or a Bluetooth network.

In at least one embodiment, the display panel 304 is based on OLED display panel. In a variant embodiment, the display panel 304 is based on LED display panel, or alternatively a mini-LED display panel or a micro-LED display panel. In another variant embodiment, the display panel comprises (not illustrated) a backlight that generates light coupled to a light transmission-type panel that generates the image by filtering the light accordingly. The backlight may be based on LEDs, mini-LEDs, micro-LEDs, OLEDs, QD-LEDs (Quantum Dot-Light Emitting Diodes) or CCFLs (Cold-Cathode Fluorescent Lamps). The light transmission-type panel may be a LCD (Liquid Crystal Display) panel.

Various elements of display device 300 can be provided within an integrated housing, Within the integrated housing, the various elements can be interconnected and transmit data therebetween using suitable connection arrangement, for example, an internal bus 305 as known in the art, including the Inter-IC (I2C) bus, wiring, and printed circuit boards.

In at least one embodiment, the device 300 is not a display device and does not include the display panel 304 located in a second device coupled with device 300 through the communication interface 303, this second device comprising a display panel. Examples of such devices are set-top boxes, media players, blue-ray or DVD players, or more general content receivers and decoders. In such embodiment, the result of the method is that the image contains less light, and therefore will require less energy when being displayed.

Although some embodiments of the present invention have been illustrated in the accompanying drawings and described in the foregoing description, it should be understood that the present invention is not limited to the disclosed embodiments, but is capable of numerous rearrangements, modifications and substitutions without departing from the invention as set forth and defined by the following claims.

The invention claimed is:

1. A method comprising:

determining, for a pixel of an image located at a position within an input image, a scaling value based on human visual sensitivity at the position of the pixel; and scaling a luminance of the pixel by an amount based on the scaling value, wherein the human visual sensitivity is determined by a pixel map of contrast sensitivities $S_{img}$ as follows:

$$S_{img} = S\left(L,\, k\, G \otimes \underset{u_i}{\operatorname{argmax}}(CWT \cdot S(L, u_i))\right)$$

wherein CWT is a continuous wavelet transform, L is a pixel map of luminance values of the input image, G is a smoothing kernel, $u_i$ are the frequencies defined by levels i of the CWT, and k is a constant representing a second scaling value, and Sis a contrast sensitivity function.

2. The method of claim 1, wherein the amount of scaling is equal to the scaling value.

3. The method of claim 1, wherein the amount of scaling is smaller than the scaling value.

4. The method of claim 1, wherein the amount of scaling is greater than the scaling value.

5. The method of claim 1, further comprising displaying, on a screen, an image with scaled luminance.

6. The method of claim 5, wherein the screen is based on one or more of an organic light-emitting diode (LED) display technology, a micro-LED technology, a mini-LED technology, micro-electromechanical systems technology, and a liquid crystal display technology with uniform or non-uniform backlight based on one or more of cold cathode fluorescent lamp, LED, mini-LED or micro-LED technologies.

7. A non-transitory computer-readable medium comprising instructions for, when executed on a processor, performing a method according to claim 1.

8. The method of claim 1, wherein the luminance scaling is determined, for the pixel x, by:

$$L_{scaled(x)} = L\frac{1-\frac{f}{S(x)}}{1+\frac{f}{S(x)}}$$

wherein f is a modulation factor.

9. The method of claim 1, wherein the contrast sensitivity function is using Barten's model.

10. An apparatus comprising at least one processor configured to:

determine, for a pixel of an image located at a position within an input image, a scaling value based on human visual sensitivity at the position of the pixel; and scale a luminance of the pixel by an amount based on the scaling value, wherein the human visual sensitivity is determined by a pixel map of contrast sensitivities $S_{img}$ as follows:

$$S_{img} = S\left(L, k\, G \otimes \underset{u_i}{\operatorname{argmax}}(CWT \cdot S(L, u_i))\right)$$

wherein CWT is a continuous wavelet transform, L is a pixel map of luminance values of the input image, G is a smoothing kernel, $u_i$ are the frequencies defined by levels i of the CWT, and k is a constant representing a second scaling value, and Sis a contrast sensitivity function.

11. The apparatus of claim 10, further comprising a screen and wherein the processor is further configured to display an image with scaled luminance.

12. The apparatus of claim 11, wherein the screen is based on one or more of an organic light-emitting diode (LED) display technology, a micro-LED technology, a mini-LED technology, micro-electromechanical systems technology, and a liquid crystal display technology with uniform or non-uniform backlight based on one or more of cold cathode fluorescent lamp, LED, mini-LED or micro-LED technologies.

13. The apparatus of claim 10, being selected in a group comprising a television, a smartphone, a laptop, a camera, and a tablet.

14. The apparatus of claim 10, wherein the luminance scaling is determined, for the pixel x, by:

$$L_{scaled(x)} = L\frac{1-\frac{f}{S(x)}}{1+\frac{f}{S(x)}}$$

wherein f is a modulation factor.

15. The apparatus of claim 10, wherein the contrast sensitivity function is using Barten's model.

* * * * *